United States Patent [19]

Myohga et al.

[11] Patent Number: 5,319,278
[45] Date of Patent: Jun. 7, 1994

[54] LONGITUDINAL-TORSIONAL RESONANCE ULTRASONIC MOTOR WITH IMPROVED SUPPORT STRUCTURE

[75] Inventors: Osamu Myohga; Takeya Hashiguchi; Takeshi Inoue, all of Tokyo, Japan

[73] Assignee: NEC Corporation, Japan

[21] Appl. No.: 72,721

[22] Filed: Jun. 7, 1993

[30] Foreign Application Priority Data

Jun. 5, 1992 [JP] Japan .................................. 4-145182
Dec. 9, 1992 [JP] Japan .................................. 4-329050

[51] Int. Cl.⁵ .......................................... H01L 41/08
[52] U.S. Cl. ................................. 310/323; 310/325; 310/333; 310/351
[58] Field of Search ............... 310/323, 325, 328, 333, 310/346, 326, 351-353

[56] References Cited

U.S. PATENT DOCUMENTS

| | | | |
|---|---|---|---|
| 3,694,675 | 9/1972 | Loveday | 310/325 |
| 4,634,915 | 1/1987 | Mukoujima et al. | 310/323 |
| 4,703,214 | 10/1987 | Mishiro | 310/328 |
| 5,017,823 | 5/1991 | Okumura | 310/323 |
| 5,051,647 | 9/1991 | Uchikawa et al. | 310/323 |
| 5,115,161 | 5/1992 | Myohga et al. | 310/323 |
| 5,264,753 | 11/1993 | Mukohjima et al. | 310/323 |

*Primary Examiner*—Mark O. Budd
*Attorney, Agent, or Firm*—Laff, Whitesel, Conte & Saret

[57] ABSTRACT

An ultrasonic motor comprises a rotor and a stator between which a pressurized face-to-face contact is established. The stator includes a longitudinal vibrator for producing a longitudinal thrust in the axial direction thereof and a torsional vibrator for transmitting a torsional thrust to the rotor in response to a longitudinal thrust timely generated by the longitudinal vibrator. The stator is supported by a structure which comprises a ring portion secured to the stator and a plurality of limb portions radially extending from the ring portion. Each of the limb portions has such an effective length and a width that the oscillation frequency of the motor matches the primary resonant frequency of a vibration of the limb portion generated on a plane normal to the axial direction of the stator and has such a thickness that the oscillation frequency matches an intermediate point between adjacent antiresonant frequencies of a vibration of the limb portion generated in the axial direction of the stator.

4 Claims, 3 Drawing Sheets

LONGITUDINAL-TORSIONAL RESONANCE ULTRASONIC MOTOR WITH IMPROVED SUPPORT STRUCTURE

BACKGROUND OF THE INVENTION

1. Field of the Invention

The present invention relates generally to ultrasonic motors, and more specifically to an ultrasonic motor of the type wherein longitudinal and torsional vibrations are combined to produce a standing wave pattern that gives a rotational drive of high torque.

2. Description of the Related Art

As illustrated in FIG. 1A, a conventional ultrasonic motor of the longitudinal-torsional composite resonator type comprises a stator 10 for providing torsional and longitudinal vibrations and a rotor 11 driven by the stator in a direction determined by the timing of an instantaneous longitudinal distortion occurring with respect to torsional distortions of a predetermined direction. If the stator is given an upward thrust at the same time it is given a clockwise distortion, the torsional thrust is transmitted to the rotor, giving it a clockwise rotation. A ring-shaped, planar support member 12 is secured between the torsional and longitudinal vibrators of the stator 10. Support member 12 is formed with screw holes 13 (FIG. 1B) to mount the motor on a stationary body 14 using screws 15. Because of the high stiffness of the support member 12 on a plane perpendicular to the longitudinal axis of the stator, the torsional vibration of the stator is undesirably constrained in terms of operating efficiency. If the thickness of the support member 12 is thinner than a certain value, it no longer acts as a constraint on the longitudinal vibration of the stator. However, if one of the antiresonant frequencies of the bending vibration of the support member 12 in the direction of its thickness matches the frequency of the stator's longitudinal vibration, it would not only act as a constraint on the torsional vibration but on the longitudinal vibration. The efficiency of an ultrasonic motor with a diameter of 15 mm using the conventional support structure is below 15%.

SUMMARY OF THE INVENTION

It is therefore an object of the present invention to provide an improved support structure for an ultrasonic motor of the longitudinal-torsional composite resonance type for increasing the operating efficiency of the motor.

According to the present invention, there is provided an ultrasonic motor which is operated at an oscillation frequency. The motor comprises a cylindrical rotor having a contact face and a cylindrical stator having a contact face engaging the contact face of the rotor under pressure. The stator includes a longitudinal vibrator for producing a longitudinal thrust in the axial direction of the stator and a torsional vibrator for producing a torsional thrust. The torsional thrust is transmitted to the rotor in response to a longitudinal thrust timely generated by the longitudinal vibrator, both of the vibrators being driven at the oscillation frequency. A support structure for the stator comprises a ring portion secured to the stator and a plurality of limb portions radially extending from the ring portion. Each of the limb portions has such an effective length and a width that the oscillation frequency matches the primary resonant frequency of a vibration of the limb portion generated on a plane normal to the axial direction of the stator and has such a thickness that the oscillation frequency matches an intermediate point between adjacent antiresonant frequencies of a vibration of the limb portion generated in the axial direction of the stator. The operating efficiency of the ultrasonic motor is improved to 55%.

BRIEF DESCRIPTION OF THE DRAWINGS

The present invention will be described in further detail with reference to the accompanying drawings, in which.

DETAILED DESCRIPTION

Figure 1A:
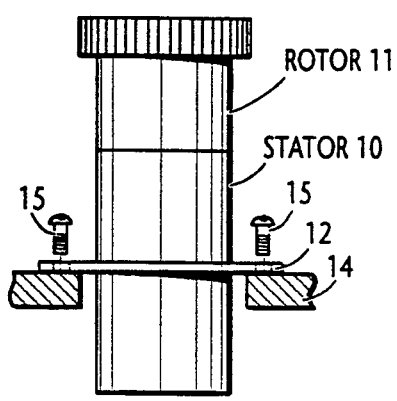
FIG. 1A is a view in elevation of an ultrasonic motor using a prior art support structure.
Figure 1B:
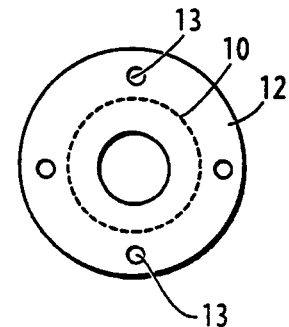
FIG. 1B is a plan view of the prior art support structure.
Figure 2:
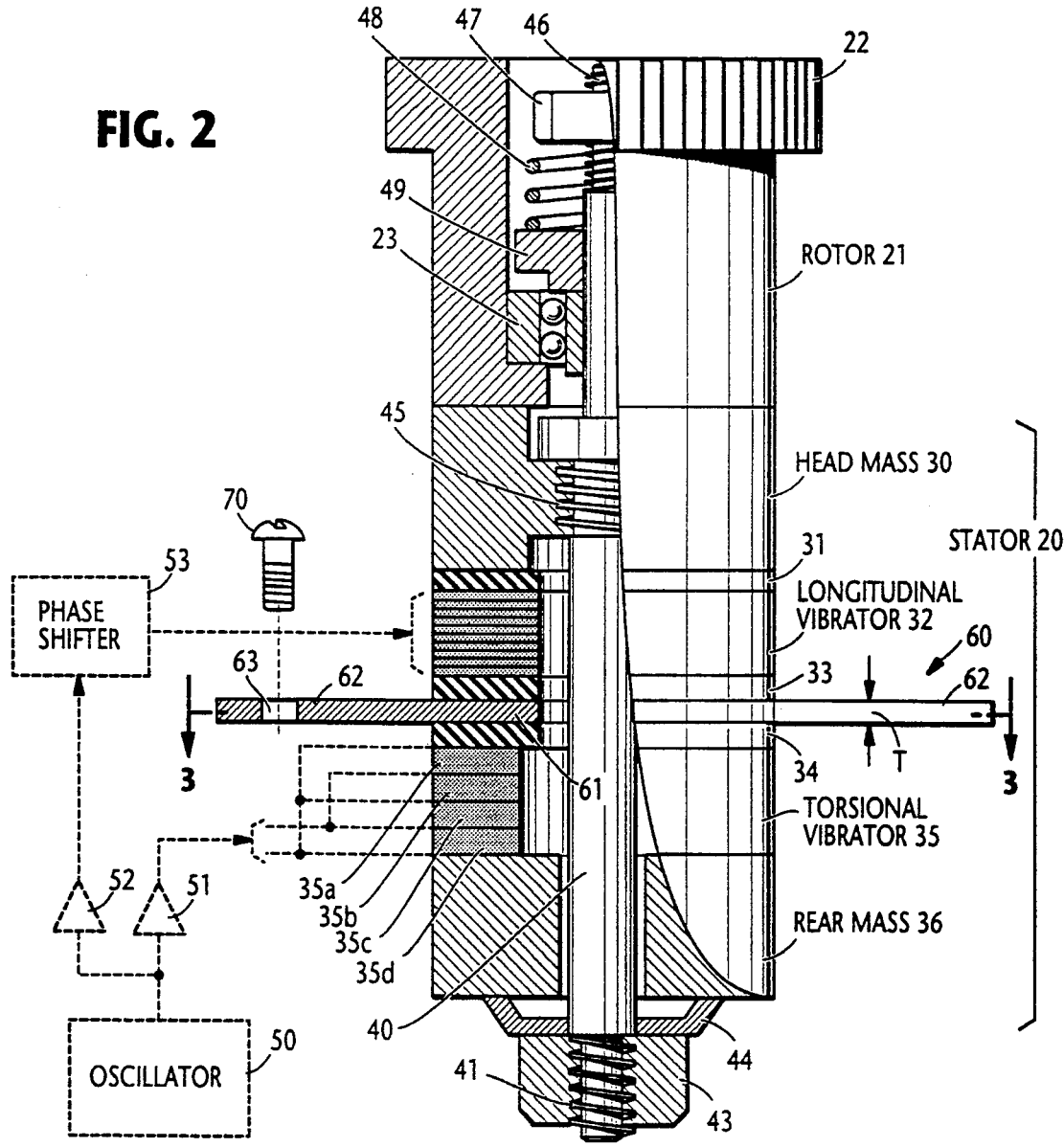
FIG. 2 is a view in partially cross-section of an ultrasonic motor incorporating a support structure of the present invention.

In FIG. 2, the cylindrical stator 20 of the ultrasonic motor according to a first embodiment of the present invention is comprised of a cylindrical head mass member 30 and a cylindrical rear mass member 36. Located adjacent the rear mass member 36 is a torsional vibrator 35 which is formed by a plurality of stacked, ring-shaped circumferentially deformable elements 35a, 35b, 35c and 35d. A longitudinal vibrator 32 formed by a plurality of stacked, ring-shaped longitudinally deformable elements is located between ring-shaped insulators 31 and 33. A support member 60 of the present invention is secured between ring-shaped insulators 33 and 34. The cylindrical rotor 21 of the motor is formed with a toothed wheel portion 22, which may be engaged with a member to be driven by the motor, and includes a ball bearing 23 secured to the inner wall thereof.

Extending into stator 20 and rotor 21 is a shaft 40 having a toothed portion 41 at the lower end which is meshed with a nut 43. A leaf spring 44 is disposed between nut 43 and the lower end of rear mass member 36. Shaft 40 is toothed at an intermediate portion thereof as shown at 45 where it is meshed with a toothed inner wall of the head mass member 30. By tightening the nut 43, the head and rear mass members 30 and 36 together with the intermediate members between them, are firmly pressed together by the shaft 40. The upper portion of shaft 40, secured to the ball bearing 23, is formed with a toothed portion 46 which is in mesh with a nut 47 to urge a coil spring 48 against a block 49 contacting the ball bearing 23, so that by appropriately tightening the nut 47 the lower end face of rotor 21 is pressurized against the upper face of head mass member 30 of the stator and an appropriate frictional contact is established therebetween to allow efficient transmission of a torsional thrust from the stator to the rotor.

An oscillator 50 generates a high-frequency sine-wave voltage which is coupled by an amplifier 51 to the electrodes of torsional vibrator 35 and by an amplifier 52 and a phase shifter 53 introduces a certain of the longitudinal vibrator 32. Phase shifter 53 introduces a certain phase shift to the oscillator voltage so that if the motor is to give a clockwise rotation the longitudinal vibrator 32 provides a longitudinal deformation timely when torsional vibrator 35 is given a clockwise deformation. If the motor is to be rotated counterclockwise, a 180-degree phase shift is added to the phase angle of the clockwise rotation.

Figure 3:
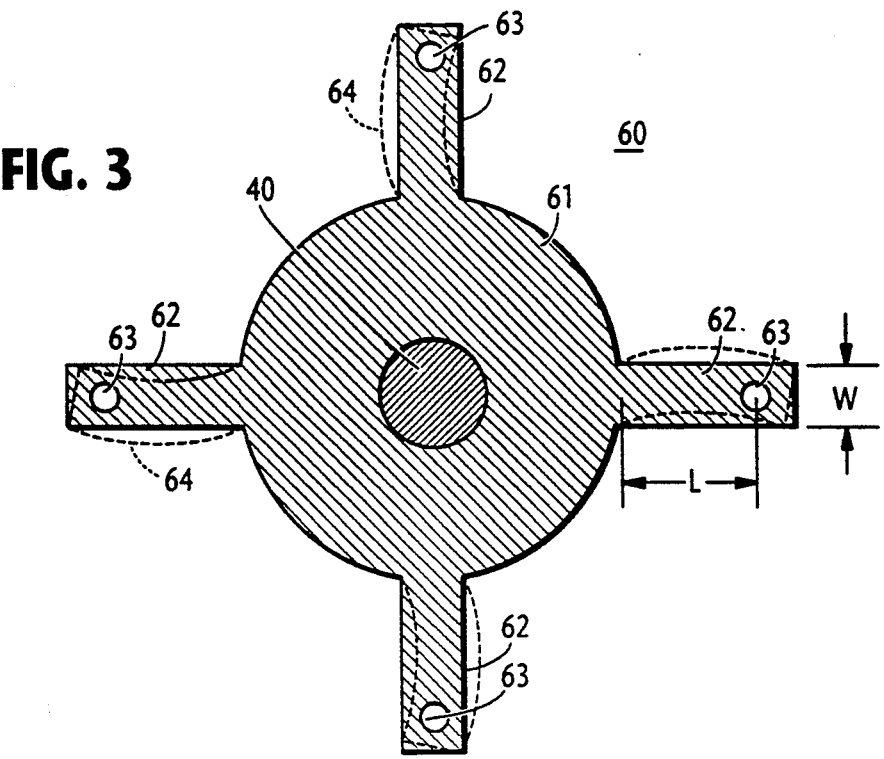
FIG. 3 is a cross-sectional view taken along the lines 3—3 of FIG. 2, showing details of the support structure of the present invention.

Preferably, the support member 60 is located in a position which corresponds to one of the nodal points of the longitudinal vibration of the stator. As shown in FIG. 3, the support member 60 is comprised of a ring portion 61 and four limb portions 62 radially extending from the ring portion 61. Each limb portion 62 is formed with a screw hole 63 at the distal, or free end thereof through a screw 70 (FIG. 2) may be inserted for holding the limb portion 62 to a suitable base, not shown.

The torsional vibration of the stator 20 is efficiently coupled to the rotor 21 if the length "L" and width "W" of limb portions 62 are determined such that the primary (first-order) resonant frequency of the transversal oscillatory component of limb portions 62 (as indicated by dotted lines 64) that is normal to the length of the stator matches the frequency of the oscillator 50, and if the thickness "T" of limb portions 62 is determined such that an intermediate point between adjacent antiresonant frequencies of their longitudinal oscillatory component that is parallel to the length of the stator matches the frequency of the oscillator 50. The matching of the intermediate antiresonant frequency to the frequency of oscillator 50 is to minimize the damping effect of the support member 60 on the longitudinal vibration of the stator 20. Note that the length "L" of each limb portion 62 is measured between its proximal end to the ring portion 61 and a distal point located at the center of the screw hole 63.

If the primary resonant frequency of the longitudinal oscillatory component of limb portions 62 were to match the frequency of oscillator 50 in the same way as in the case of their transversal component, the oscillator frequency would have to be much lower than the desired frequency. In addition, if one of the primary antiresonant frequencies of the limb portions' longitudinal oscillatory component is caused to match the oscillator frequency, the mechanical impedance of the support member 60 as viewed from the stator 20 would be prohibitively large and much of the longitudinal vibration of the stator 20 would be lost.

Four models of the support member 60 were manufactured from stainless steel (SUS 304) as given by the following Table for supporting an ultrasonic motor having a diameter of 15 mm and the efficiency of the motor was tested by operating it at 35.1 kHz.

TABLE

| Model | Width W (mm) | Length L (mm) | Thickness T (mm) | Motor Efficiency |
|---|---|---|---|---|
| No. 1 | 5.5 | 8.5 | 0.4 | 55% |
| No. 2 | 5.5 | 8.5 | 0.4 | 55% |
| No. 3 | 7.0 | 9.5 | 0.45 | 55% |
| No. 4 | 5.0 | 9.0 | 0.4 | 55% |

As indicated, motor efficiencies as high as 55% were obtained. Support structure models of dimensions other than those of the Table were also manufactured and tested. The test indicates that the efficiency of the motor using each of such support models was lower than 30%.

Figure 4:
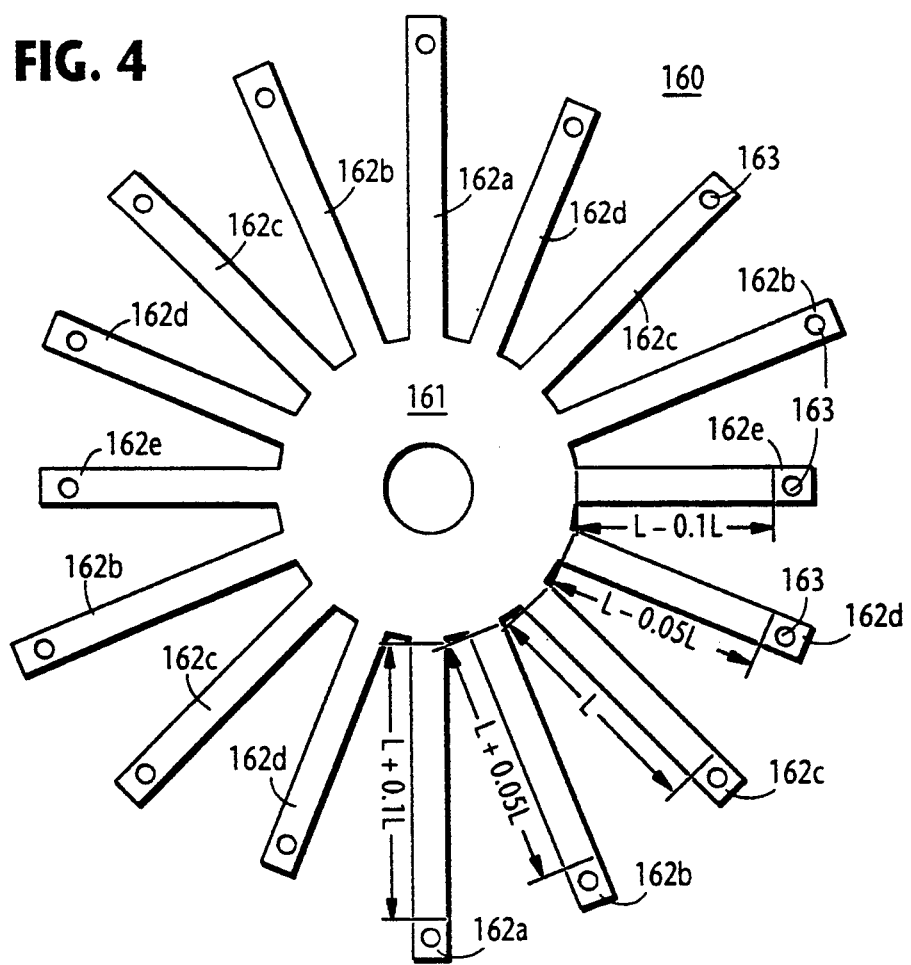
FIG. 4 is a plan view of a motor support structure according to a modified embodiment of the present invention.

FIG. 4 is an illustration of a developed form of a motor support structure according to a second embodiment of the present invention. According to this modification, the support structure 160 has limb portions 162 of different lengths which vary in the range of ±10% of length L. Specifically, it comprises a pair of maximum-length limb portions 162a diametrically extending from a ring portion 161, and a pair of diametrically extending minimum-length limb portions 162e. Located between these maximum and minimum length limb portions are two pairs of diametrically extending limb-portions 162b of length L+0.05 L, two pairs of diametrically extending limb-portions 162c of length L, and two pairs of diametrically extending limb-portions 162d of length L−0.05 L. The support structure is manufactured in the form of FIG. 4 by cutting it out from a blank sheet as by a stamping process and some of the limb portions are removed by a subsequent process according to the vertical dimensions of component parts of an equipment which may be mounted close to the ultrasonic motor or according to the vertical dimensions of the portions of a base member on which the motor may be mounted.

Figure 5:
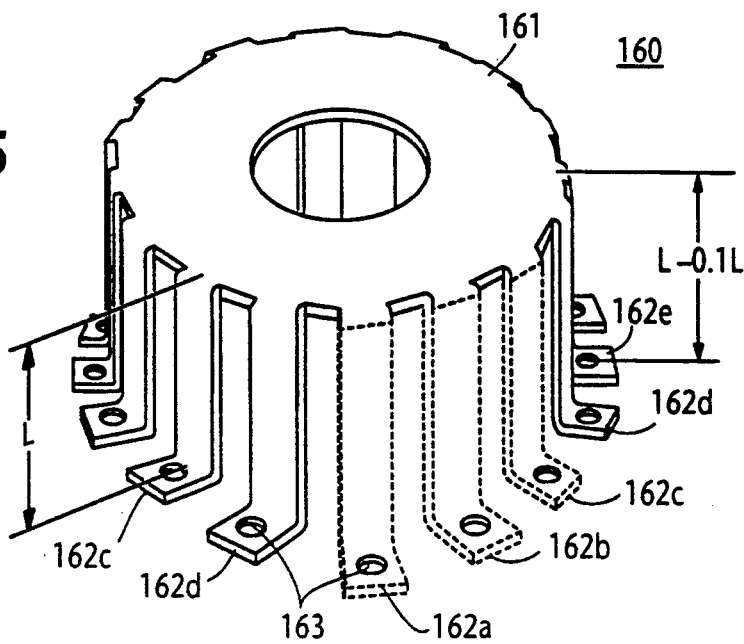
FIG. 5 is a perspective view of the support structure of the modified embodiment.
Figure 6A:
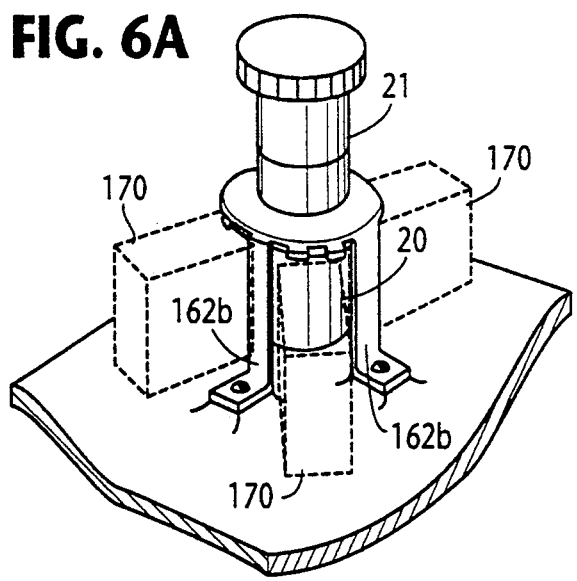
FIGS. 6A, 6B and 6C are views illustrating the ultrasonic motor supported by the modified embodiment to meet different mounting requirements.
Figure 6B:
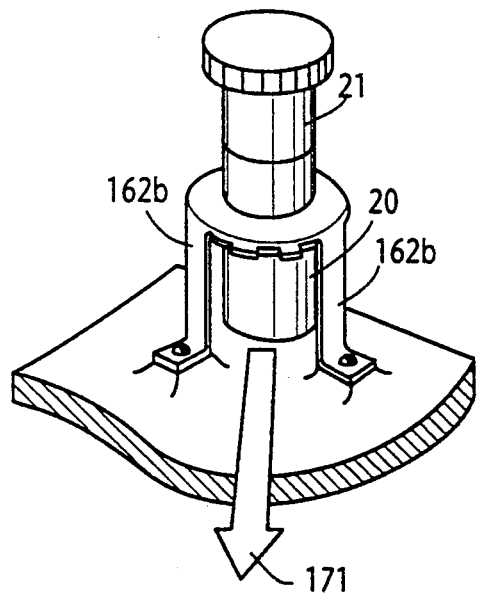
Figure 6C:
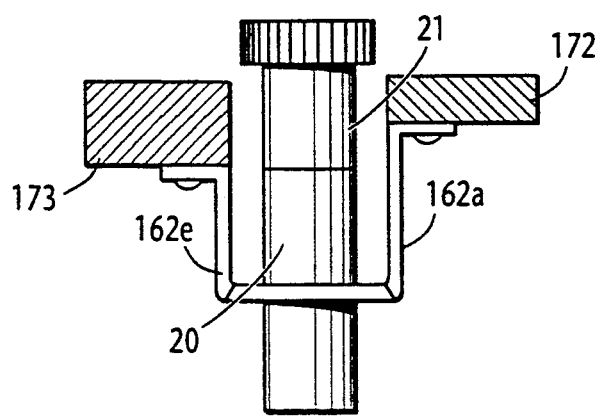

Each of the limb portions 162 which is left after the cut-off process is bent at right angles at the proximal end to ring portion 161 and further bent at right angles at a point adjacent the hole 163 as shown in FIG. 5. It is seen that length L is measured between the proximal and distal bent portions. In one example, limb portions 162a, 162c, 162d and 162e are cut off, leaving the four limb portions 162b, which are then bent as shown in FIG. 6A. The rooms created in this way are used to allow adjacent component parts 170 to be closely mounted with respect to the stator 20. This is advantageous for applications where high packing density mounting is required. Alternatively, the rooms so created by the cutting off of limbs are used to allow wirings of the motor to be withdrawn therethrough to the outside as indicated by an arrow 171 in FIG. 6B. Additionally, when the motor is to be mounted on bases 172 and 173 of different heights as shown in FIG. 6C, maximum-length limb portions 162a and minimum-length limb portions 162e can be used to accommodate the difference in height, while cutting off all the other limb portions.

Experiments showed that the high efficiency performance of the motor can be maintained when the length of limb portions is in the range of ±10% of the optimum length L.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. An ultrasonic motor operating at an oscillation frequency, comprising:
   a cylindrical rotor having a contact face;
   a cylindrical stator having a contact face engaging the contact face of said rotor under pressure, the stator including a longitudinal vibrator for producing a longitudinal thrust in an axial direction of the stator and a torsional vibrator for producing a torsional thrust on a plane normal to said axial direction, the torsional thrust being transmitted to said rotor in response to a longitudinal thrust timely generated by the longitudinal vibrator, both of said vibrators being driven at said oscillation frequency; and a support structure for supporting said stator, said support structure comprising a ring portion secured to said stator and a plurality of limb portions radially extending from the ring portion, each of said limb portions having such an effective length and a width that said oscillation frequency matches the primary resonant frequency of a vibration of the limb portion generated on a plane normal to the axial direction of the stator and having such a thickness that said oscillation frequency matches an intermediate point between adjacent antiresonant frequencies of a vibration of the limb portion generated in said axial direction of the stator.

2. An ultrasonic motor as claimed in claim 1, wherein each of said limb portions is bent at right angles at a point proximal to the ring portion and bent at right angles at a distal point from said ring portion.

3. An ultrasonic motor as claimed in claim 2, wherein said limb portions have different effective lengths which are in the range between 90 percent and 110 percent of an optimum value.

4. An ultrasonic motor as claimed in claim 1, wherein said limb portions have different effective lengths which are in the range between 90 percent and 110 percent of an optimum value.

* * * * *